(12) United States Patent
Cheng

(10) Patent No.: US 7,322,719 B2
(45) Date of Patent: Jan. 29, 2008

(54) ILLUMINATION SYSTEM

(75) Inventor: Chuan-Te Cheng, Miao-Li County (TW)

(73) Assignee: Coretronic Corporation, Hsinchu (TW)

( * ) Notice: Subject to any disclaimer, the term of this patent is extended or adjusted under 35 U.S.C. 154(b) by 36 days.

(21) Appl. No.: 11/164,487

(22) Filed: Nov. 24, 2005

(65) Prior Publication Data

US 2006/0198140 A1    Sep. 7, 2006

(30) Foreign Application Priority Data

Dec. 9, 2004    (TW) .............................. 93138227 A

(51) Int. Cl.
*F21V 7/00* (2006.01)
(52) U.S. Cl. ...................... 362/298; 362/241; 362/247; 362/346
(58) Field of Classification Search ................ 362/297, 362/298, 346, 241, 247
See application file for complete search history.

(56) References Cited

U.S. PATENT DOCUMENTS 7,090,357 B2 *   8/2006   Magarill et al. ............... 353/94
2005/0190562 A1 *  9/2005   Keuper et al. .............. 362/325

\* cited by examiner

*Primary Examiner*—Thomas M. Sember
(74) *Attorney, Agent, or Firm*—Winston Hsu

(57) ABSTRACT

An illumination system comprises a first light source device, a second light source device and a second reflecting portion. A first reflecting portion of the first light source device covers a part area of an opening of a reflecting shade, and the other area of the opening is formed a first light outlet. The second light source device is installed in front of the opening and has a second light outlet. A second reflecting portion is installed between the first and the second light source devices. After overlapping the optical routes of the multiple light source devices and integrating beams into a parallel light beam, the parallel light beam is then output out of the single light source device. Therefore, the brightness of entirety can be enhanced, and the uniformity of images on the screen is still maintained even one of the light source devices is damaged.

20 Claims, 8 Drawing Sheets

ILLUMINATION SYSTEM

BACKGROUND OF THE INVENTION

1. Field of the Invention

The present invention relates to an illumination system, and more particularly to an illumination system of a multiple light source devices.

2. Description of Related Art

Currently, an illumination system with a single light source device is mostly adopted in a projection system. However, for a large-sized meeting place, the projection system needs to be used to emit images on a larger area and a screen with a longer distance so that a light beam output from the illumination system needs higher brightness to enable audiences in the whole meeting place to see the images on the screen clearly. If the single light source is adopted to provide the high brightness, the power of the adopted single source device is enhanced relatively, consequently, the problems such as high temperature, heat dissipation and difficult cooling are yielded. Therefore, how to improve the high temperature problem on the premise that the high brightness is provided is a serious problem to be improved for the illumination system.

An illumination system with multiple light source devices is adopted to solve the problem mentioned above at the present. Please refer to FIG. 1. A projection system 10 comprises a collector module 11, integrators 12, a P/S converter 13, condensers 14A and 14B and a display panel 15, in which the collector module 111 has two parabolic-curved reflectors 111 installed side by side and two light sources 112 are respectively corresponding to the reflectors 111. Each reflector 111 has a parabolic-curved reflecting surface 113 facing the integrator 12 and the light source 112 is positioned on a focus of the reflecting surface 113. When the light sources 112 emit a light beam, the light beam can respectively be projected on the corresponding reflecting surfaces 113 to form a parallel light beam, and then the parallel light beam output into the integrators 12 to convert to a uniform light beam. Thereafter, the light beam is condensed again through the P/S converter 13 and the condensers 14A and 14B to project on the display panel 15. Finally, images are displayed on a screen (not shown) through a projection lens (not shown). However, although the light sources installed side by side can be utilized to increase the brightness of the collector module 11 mentioned above, the parallel light beam reflected from each parabolic-curved reflector 111 has a definite light distribution area. The light distribution area of the reflectors 111 installed side by side is the double of the single reflector 111 so that the light distribution area is broad. Consequently, the integrator 12, the P/S converter 13, the condenser 14A and etc are caused to need a larger volume. Therefore, the higher system cost is caused and design principles of light, thin, short and small cannot be conformed to. Moreover, when one of the light sources is damaged and malfunctioned, it causes only half of images on the screen. Therefore, problems such as the big volume and that only half of images on the screen are caused owing to the damage of one of the light sources still exist in multiple light sources of a conventional illumination system, these problems need to solve by researching and developing efforts.

SUMMARY OF THE INVENTION

One object of the present invention is to provide an illumination system, utilizing an installment of a reflecting portion to overlay optical routes of multiple light source devices and integrate light beams into a single parallel light beam, and being then output out of a single light source device. Therefore, the brightness of entirety can be enhanced, and when one of the light sources is damaged and malfunctioned, the uniformity of images on a screen can still be maintained to allow all images to be displayed normally.

Another object of the present invention is to provide the illumination system, utilizing outputting the integrated parallel light beam through a second light outlet with half opening area so as to reduce a light distribution area to allow the volume of the illumination system to be reduced.

Yet another object of the present invention is to provide the illumination system, in which the reflecting portion is a cold mirror so as to remove infrared light of the light source so as to lower the heat of the light source.

Yet another object of the present invention is to provide the illumination system, in which the reflecting portion can be a dichroic mirror for adjusting of color temperature of the system.

Yet another object of the present invention is to provide the illumination system with the multiple light source devices, in which a condensing element is installed in front of the light outlet to form a condensing light beam to be applied in a digital light processing (DLP) projection system.

For attaining to the objects mentioned above, the illumination system comprises a first light source device, a second light source device and a second reflecting portion, a first reflecting portion of the first light source device covers a part area of an opening of a reflecting shade, and the other area of the opening is formed to be a first light outlet, the second light source device is disposed in front of the opening and has a second light outlet, the second reflecting portion is installed between the first and the second light source devices to guide a light beam from the first light source device to output from the second light outlet. The installment of the reflecting portion is utilized to overlay optical routes of multiple light sources and integrate the routes into the single parallel beam, and the light beam is then output out of the single light source device, therefore, the brightness of entirety can be enhanced, and when one of the light source devices is damaged, the uniformity of the images on the screen can still be maintained to allow images to be displayed normally.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Six preferred embodiments are brought to explain the adopted technological means and other effects for attaining to the objects of the present invention mentioned above accompanying the drawings as the followings:

The First Preferred Embodiment

Figure 2:
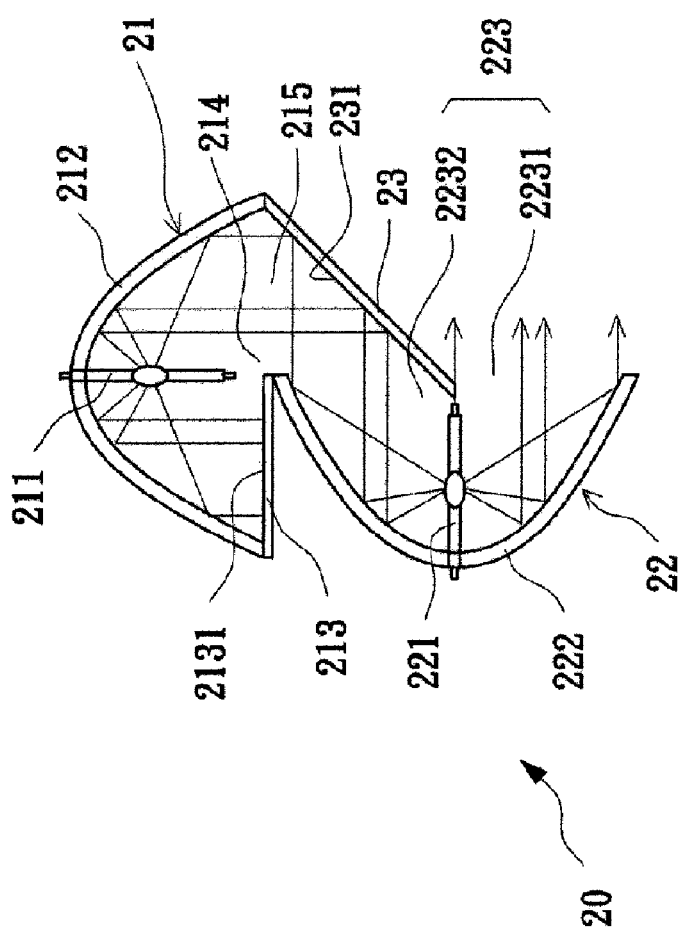
FIG. 2 is an optically schematic view, showing an illumination system of a first preferred embodiment according to the present invention.

The first embodiment provides an illumination system structure constituted by light source devices with two optical axes thereof perpendicular to each other. Please refer to FIG. 2. An illumination system 20 comprises a first light source device 21, a second light source device 22 and a second reflecting portion 23, in which the first light source device 21 comprises a burner 211, a parabola-shaped reflecting shade 212 and a first reflecting portion 213. The burner 211 is installed inside of the reflecting shade 212 and positioned on a focus of the reflecting shade 212. A light beam emitted from the burner 211 is reflected by the parabola-shaped reflecting shade 212 to generate a parallel light beam. The reflecting shade 212 has an opening 214 and the first reflecting portion 213 covers a part area of the opening 214, the other area of the opening 214 is formed a first light outlet 215. In the first embodiment, the first reflecting portion 213 approximately occupies a half area of the opening 214. The first reflecting portion 213 is a reflection mirror that a surface thereof facing the burner 211 is a reflection mirror surface 2131 and the first reflecting portion 213 is disposed perpendicularly to the burner 211. One end of the first reflecting portion 213 is connected to a rim of the reflecting shade 212 and the other end of the first reflecting portion 213 is extended to a place close to the burner 211 such that a light beam emitted from the burner 211 can return back to the reflecting shade 212 along an original route by means of the reflection of the reflection mirror surface 2131, and the parallel light beam is then output from the first light outlet 215.

The second light source device 22 is installed in front of the opening 214 of the first light source device 21, and comprises a burner 221, a parabola-shaped reflecting shade 222 and an opening 223, in which a light beam emitted from the burner 221 is reflected by the parabola-shaped reflecting shade 222 to generate a parallel light beam and the burner 221 of the second light source device 22 is disposed perpendicularly to the burner 211 of the first light source device 21. The burner 211 of the first light source device 21 is disposed in a vertical direction and the burner 221 of the second light source device 22 is disposed in a horizontal direction in the first embodiment. The opening 223 consists of a second light outlet 2231 and a third light outlet 2232. The second light outlet 2231 is disposed far away from the first light outlet 215 of the first light source 21 to cause the light beam provided by the burner 221 is directly output out of the second light source device 22 and the first light source device 21. The third light outlet 2232 faces the second reflecting portion 23 and is installed adjacently to the first light outlet 215 to allow the light beam emitted from the burner 221 to be reflected by the second reflecting portion 23 back into the first light source device 21.

The second reflecting portion 23 is disposed between the first light source device 21 and the second light source device 22 so as to guide the light beam from the first light outlet 215 of the first light source device 21 to be output from the second light outlet the second light outlet 2231 or the light beam from the third light outlet 2232 of the second light source device 22 is output into the first light source device 21. The second reflecting portion 23 in the first embodiment is a reflection mirror that a surface thereof facing the first light outlet 215 and the third light outlet 2232 is a reflection mirror surface 231. One end of the second reflecting portion 23 is close to the rim of the reflecting shade 212 (different from the rim disposed in the first reflecting portion 213), and the other end thereof is close to the burner 221 of the second light source 22 to cause the second light outlet 2231 to approximately occupy half area of the opening 223. An inclined angle of the second reflecting portion 23 is formed in a direction opposite to the direction facing the burners 211 and 221, it is the best that the inclined angle is 45 degree relative to the horizontal direction of the embodiment such that the light beam incident into the first light source device 21 and the light beam output out of the first light source device 21 can be reflected and transmitted along the original route and output out from the second light outlet 2231 of the second light source device 22.

The light beam emitted from the burner 211 of the first light source device 21 is reflected by the reflecting shade 212 to generate the parallel light beam, a part of the light beam is directly output from the first light outlet 215, the other part of the light beam is projected on the first reflecting portion 213 and output from the first light outlet 215 after it is reflected by the first reflecting portion 213 and the reflecting shade 212. And, the light beam output from the first light outlet 215 is reflected by the second reflecting portion 23 and enters the second light source device 22 from the third light outlet 2232. Among the light beam entering the second light source device 22 or the light beam emitted from the second the burner 221 of the second light source device 22, a part of the light beam is directly reflected by the reflecting shade 222 and output out of the second light outlet 2231, the other part of the light beam is reflected by the reflecting shade 222 and the second reflecting portion 23 and returns back to the first light source device 21, the returned light beam is reflected many times between the first light source device 21 and the second light source device 22 and integrated finally to be the parallel light beam and output from the second light outlet 2231.

The installations of the first reflecting portion 213 and the second reflecting portions 23 are used to overlay the optical routes of the multiple light source devices (i.e. the first light source 21 and the second light source device 22) and integrate the beams to be the single parallel beam, and then output the single parallel light beam from the single light source device (i.e. the second light source device 22). Therefore, the brightness of entirety can be enhanced, because the brightness after general double light source devices are mixed is 1.6 times of the single light source device. Furthermore, when one of the light sources is damaged, because two light sources are installed by overlapping the optical routes in the present invention, the single light source can still maintain the uniformity of images on the screen to enable images to be displayed normally.

Besides, the limitation of the angle for the first reflecting portion 213 and the second reflecting portion 23 of the first embodiment is utilized to enable the light beam to be still transmitted along the original route to allow the light beam to maintain as the parallel light beam to be output from the second light outlet 2231.

Figure 1:
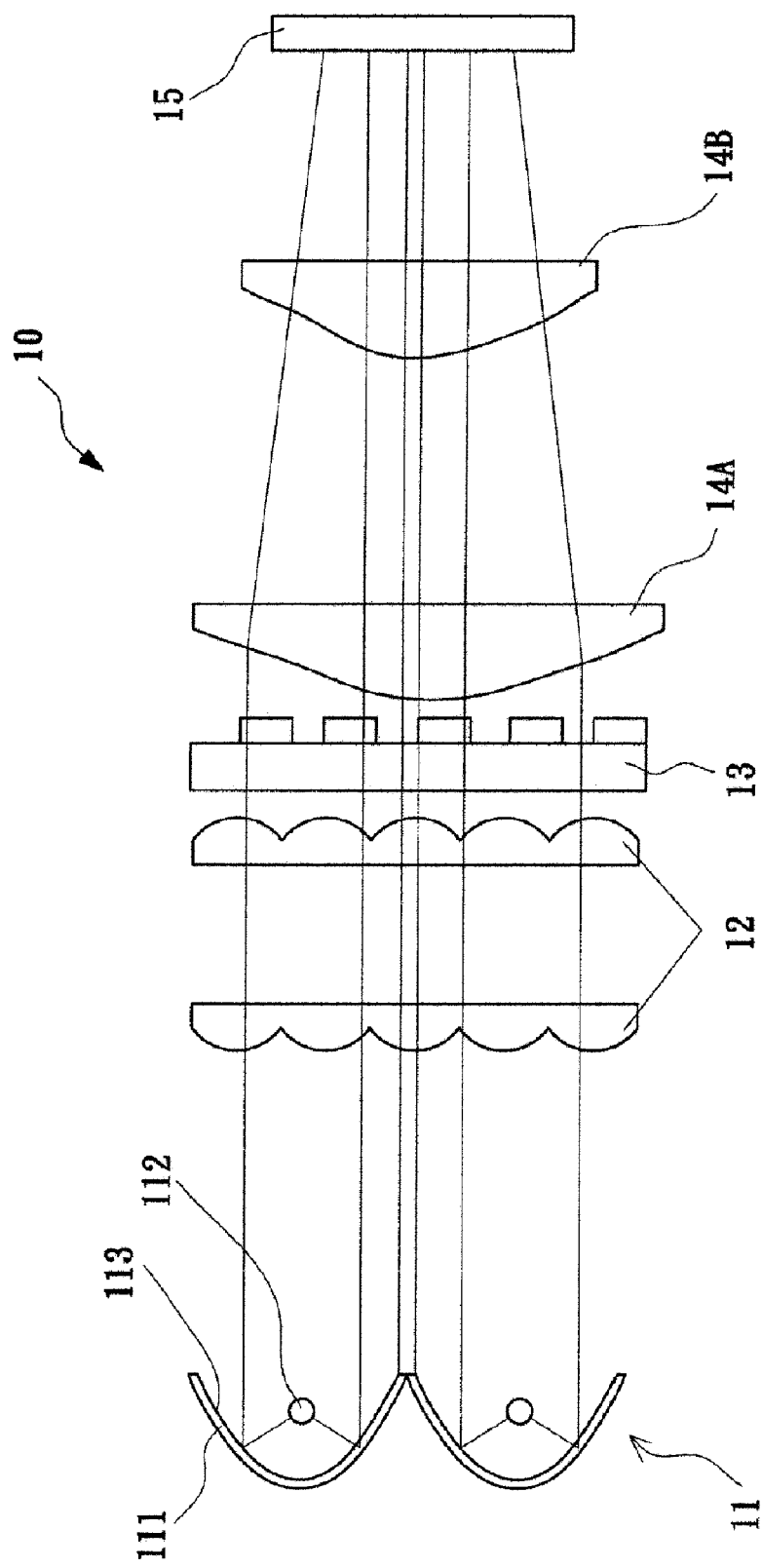
FIG. 1 is a schematic view, showing a conventional projection system with double light source devices.

The integrated parallel light beam is output from the second light outlet 2231 with half area of the opening 223 so as to reduce the light distribution area. Comparing to the double light source device structures side by side in FIG. 1, the light distribution area of the present invention is a quarter of the light distribution area of the conventional system. Therefore, the volume of the illumination system can be allowed to reduce and the system conforms to the design principles of the lightness, thinness, shortness and smallness.

Besides, a cold mirror can be adopted in the first reflecting portion 213 and the second reflecting portion 23, the cold mirror reflects short wavelengths and transmits long wavelengths, such as infrared light. When the first reflecting portion 213 and the second reflecting portion 23 are cold mirror, infrared light of the light beam transmits the first reflecting portion 213 and the second reflecting portion 23 to be removed so as to reduce the heat generated from the light source.

Moreover, dichroic mirrors can be adopted for the first reflecting portion 213 and the second reflecting portion 23 for adjusting the color temperature of the light source, the dichroic mirror is referred to a reflecting element in which the surface thereof is allowed to reflect at least one color light beam. For example, the dichroic mirror capable of reflecting blue light beam can be adopted for the first reflecting portion 213 or the second reflecting portion 23 to cause the proportion of the blue light of the integrated parallel light beam from the first light source device 21 and the second light source device 22 is increased the color temperature. Otherwise, the dichroic mirror capable of reflecting red color light and green color light is adopted for the first reflecting portion 213 or the second reflecting portion 23 to cause the proportions of the red color light and the green light of the integrated parallel light beam from the first light source device 21 and the second light source device 22 to be increased. The proportion of the blue light is lowered to decrease the color temperature.

Figure 8:
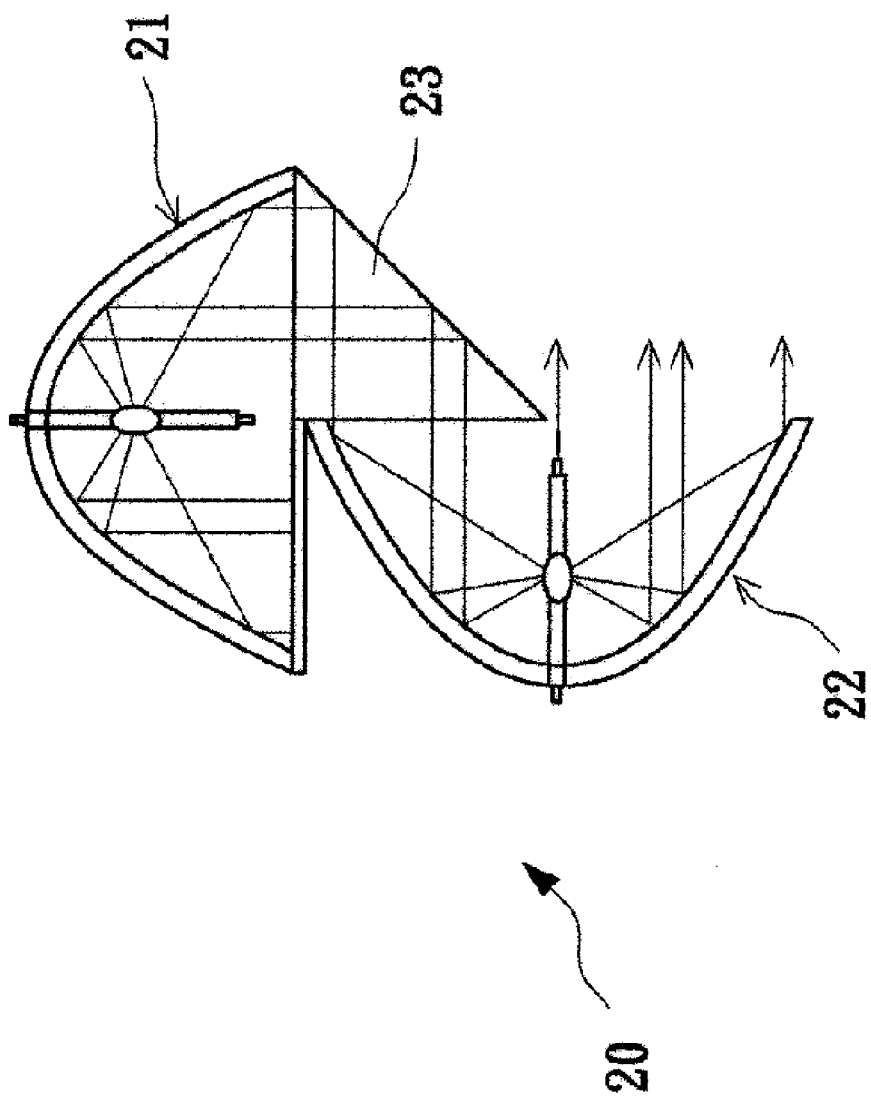
FIG. 8 is an optically schematic view, showing an illumination system with a prism according to the present invention.

Please further refer to FIG. 8. The first reflecting portion 213 and the second reflecting portion 23 are used of a prism with 45 degree angle to allow the light beam to be reflected through the total reflection.

The Second Preferred Embodiment

Figure 3:
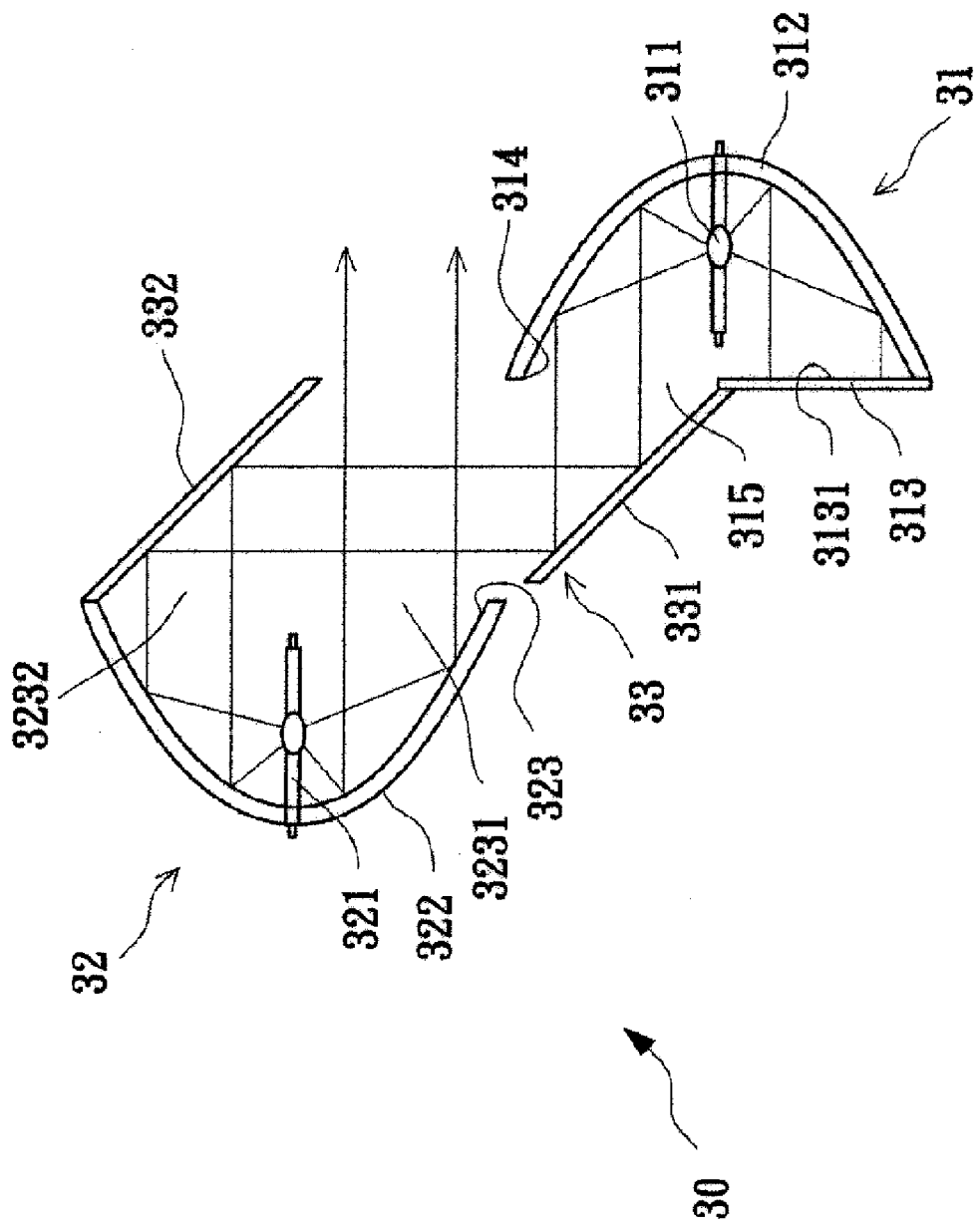
FIG. 3 is an optically schematic view, showing an illumination system of a second preferred embodiment according to the present invention.

The second embodiment is to provide an illumination system structure combined by two light source devices with the optical axes thereof parallel to each other. Please refer to FIG. 3. The illumination system 30 comprises a first light source device 31, second light source device 32 and second reflecting portion 33, in which the first light source device 31 comprises a burner 311, a parabola-shaped reflecting shade 312 and a first reflecting portion 313. The burner 311 is installed inside of the reflecting portion 313 and disposed on a focus of the reflecting shade 312. A light beam emitted from the burner 311 is reflected by the parabola-shaped reflecting shade 312 to generate a parallel beam. The reflecting shade 312 has an opening 314 and the first reflecting portion 313 is disposed to cover a part area of the opening 314, the other area of the opening 314 is formed a first light outlet 315. The first reflecting portion 313 occupies half area of the opening 314 in the second embodiment. The first reflecting portion 313 is a reflection mirror in which a surface thereof facing the burner 311 is a reflection mirror surface 3131 and the first reflecting portion 313 is disposed in a direction perpendicular to the burner 311 thereof. One end of the first reflecting portion 313 is connected to the lower end of the rim of the reflecting shade 312, and the other end thereof is extended to a position close to the burner 311 to allow the light beam emitted from the burner 311 to be reflected by the reflection mirror surface 3131 to return back to the reflecting shade 312 along an original route, and the parallel light beam is then output from the first light outlet 315.

The second light source device 32 is installed in front of the opening 314 of the first light source device 31 and comprises a burner 321, a parabola-shaped 322 and an opening 323, in which a light beam emitted from the burner 321 is reflected by the parabola-shaped reflecting shade 322 to generate a parallel beam, and the burner 321 of the second light source device 32 is disposed parallel to the burner 311 of the first light source device 31. The burner 311 of the first light source device 31 and the burner 321 of the second light source device 32 are all disposed along the horizontal direction in the second embodiment. The opening 323 consists of a second light outlet 3231 and a third light outlet 3232. The second outlet 3231 is disposed close to the first light outlet 315 of the first light source device 31, and a light beam provide by the burner 321 can be allowed to output out directly of the second light source device 32 and the first light source device 31. The third light outlet 3232 is disposed far from the first light outlet 315 and facing the second reflecting portion 33.

The second reflecting portion 33 is installed between the first light source device 31 and the second light source device 32 and constituted by a pair of reflection mirrors 331 and 332 parallel to each other to guide the light beam from the first light outlet 315 of the first light source device 31 to output from the second light outlet 3231 or a light beam emitted from the burner 321 of the second light source device 32 to guide to output into the first light source device 31. The surfaces of the reflection mirrors 331 and 332 facing the first light outlet 315 and the third light outlet 3232 are reflection mirror surfaces. One end of the reflection mirror 331 is close to the burner 311, and the other end of the reflection mirror 331 is formed an inclined angle close to a lower rim of the reflecting shade 322 by facing the direction opposite to the direction of the burner 311. One end of the reflection mirror 332 is close to an upper rim of the reflecting shade 322, the other end of the reflection mirror 332 is formed an inclined angle by facing a direction opposite to the direction of the burner 321, 45 degree is the best for the inclined angle so as to allow the light beam incident into the first light source device 31 and the light beam emitted out from the first light source device 31 can be transmitted along the original routes by the reflection, and finally output out from the second light outlet 3231 of the second light source device 32.

The light beam emitted from the burner 311 of the first light source device 31 is reflected by the reflecting shade 312 to generate the parallel beam, a part of the light beam is directly output from the first light outlet 315, the other part of the light beam is projected on the first reflecting portion 313, further output from the first light outlet 315 after it is reflected by the first reflecting portion 313 and the reflecting shade 312. Furthermore, the light beam output from the first light outlet 315 is reflected by the reflection mirrors 331 and 332 to change the optical route direction, the light beam is caused to enter the second light source device 32 through the third light outlet 3232. Among the light beam entering the second light source device 32 or the light beam emitted from the burner 321 of the second light source device 32, a part of the light beam is reflected by the reflecting shade 322 and output from the second light outlet 3231, and the other part of the light beam is reflected by the reflecting shade 322, the reflection mirror 331 and the reflection mirror 332 and returns back to the first light source device 31. The returned light beam is finally integrated into a parallel light beam to output from the second light outlet 3231 after many times reflections between the first light source device 31 and the second light source device 32.

The installments of the first reflecting portion 313 and the second reflecting portion 33 are utilized to overlap the optical routes of the multiple light source devices (i.e. the first light source device 31 and the second light source device 32) and integrate the light beam into the single parallel beam, and is then outputted from the single light source device (i.e. the second light source device 32). Therefore, the brightness of entirety can be enhanced, because the brightness after general double light source devices are mixed is 1.6 times of the single light source device. Furthermore, when one of the light sources is damaged, because two light sources are installed by overlapping the optical routes in the second present invention, the single light source can still maintain the uniformity of images on the screen to enable images to be displayed normally. Besides, the limitation of the angle for the first reflecting portion 313 and the second reflecting portion 33 is utilized to enable the light beam to be still transmitted along the original route to allow the light beam to maintain as a parallel light beam to be output from the second light outlet 3231.

The integrated parallel light beam is output from the second light outlet 3231 with a half area of the opening 323 so as to reduce the light distribution area. Comparing to the double light source device structures side by side in FIG. 1, the light distribution area of the present invention is a quarter area of the conventional system. Therefore, the volume of the illumination system can be allowed to reduce and the system conforms the design principles of the lightness, thinness, shortness and smallness.

The Third Embodiment

Figure 4:
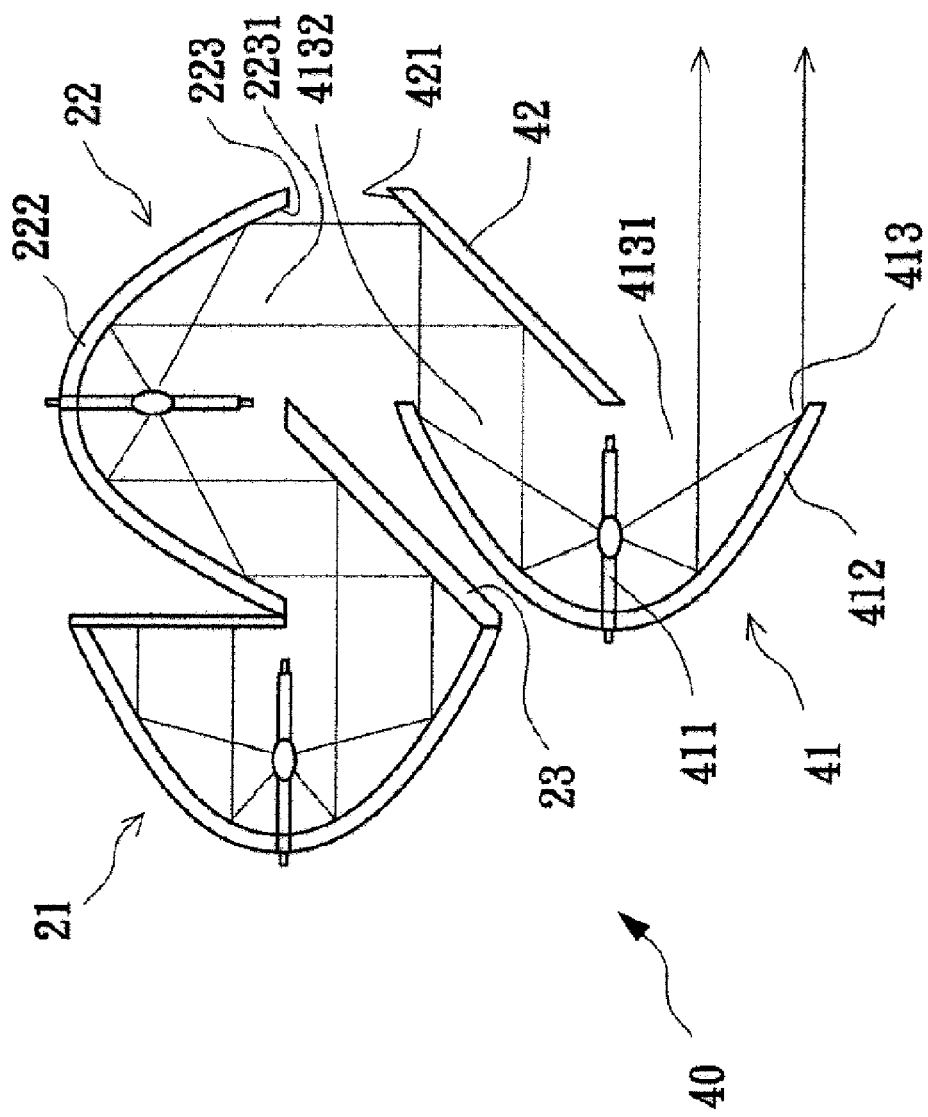
FIG. 4 is an optically schematic view, showing an illumination system of a third preferred embodiment according to the present invention.

The third embodiment is to provide an illumination system structure 40 combined by three light source devices. Please refer to FIG. 4. The illumination system structure 40 of the third embodiment is constituted by further installing a third light source device 41 and a third reflecting portion 43 in the illumination system structure 20 of the first embodiment mentioned above, in which the first light source device 21 is installed along the horizontal direction, the second light source device 22 is installed along the vertical direction and the third light source device 41 is installed in front of the opening 223 of the second light source device 22. The third light source device 41 comprises a burner 411, a parabola-shaped reflecting shade 412 and an opening 413. A light beam emitted from the burner 411 is reflected by the parabola-shaped 412 to generate a parallel light beam, and the burner 411 of the third light source device 41 is installed parallel to the burner 211 of the first light source device 21. The opening 413 consists of a fourth light outlet 4131 and a fifth light outlet 4132. The fourth light outlet 4131 is disposed far away from the second light outlet 2231 of the second light source device 22 so as to enable the light beam provided by the burner 421 to be output out of the third light source device 41, the second light source device 22 and the first light source device 21. The fifth light outlet 4132 is installed by facing the third reflecting portion 42 and adjacent to the second light outlet 2231 so as to enable the light beam provided by the burner 411 to return back into the second light source device 22.

The third reflecting portion 42 is installed between the second light source device 22 and the third light source device 41 to guide the light beam from the second light outlet 2231 to be output from the fourth light outlet 4131 or to guide the light beam from the third light source 41 into the second light source device 22. The third reflecting portion 42 is a reflection mirror in which a surface thereof facing the second light outlet 2231 and the fifth light outlet 4132 is the reflection mirror surface 421, and one end of the third reflecting portion 42 is close to the rim of the reflecting shade 222 (far away from the rim of the first light source device 21), the other end thereof is close to the burner 411 of the third light source device 41 so as to cause the fifth light outlet 4132 to occupy half area of the opening 413, and an inclined angle is formed in a direction opposite to a direction that the third reflecting portion 42 faces the burners 221 and 411. It is the best that the inclined angle is 45 degree so as to allow the light beam incident into the second light source device 22 and the light beam to output out of the second light source 22 can be transmitted along the original routes by the reflection, and finally to output from the fourth light outlet 4131 of the third light source device 41.

The light beam output from the burner 411 of the third light source device 41 is reflected by the reflecting shade 412 to generate the parallel beam, a part of the light beam is directly output out of the third light source device 41, the second light source device 22 and the first light source device 21 from the fourth light outlet 4131, the other part of the light beam is projected on the third reflecting portion 42, and returned back to the second light source device 22 and the first light source device 21. The returned light beam is finally integrated into a parallel light beam and output from the fourth light outlet 4131 after it is reflected many times between the first light source device 21 and the second light source device 22.

Utilizing three light source devices enables the brightness of the illumination system to be more enhanced, and the optical routes of the multiple light source devices (the first light source device 21, the second light source device 22 and the third light source device 41) are overlapped and integrated into the single parallel light beam, and then output out of the single light source device (i.e. the third light source device 41). Therefore, when one of the light source devices is damaged, the illumination system can maintain the uniformity of images on the screen to enable images to be displayed normally.

The Fourth Preferred Embodiment

Figure 5:
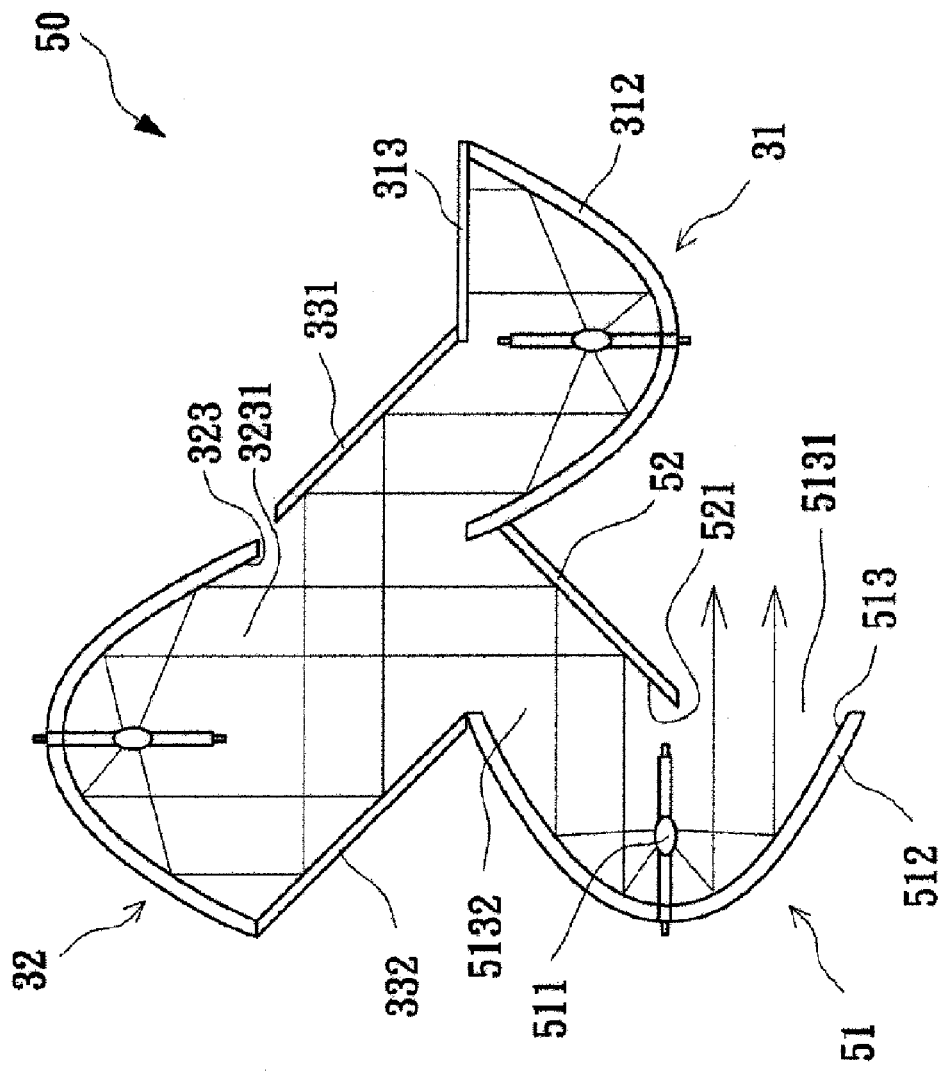
FIG. 5 is an optically schematic view, showing an illumination system of a fourth preferred embodiment according to the present invention.

The fourth embodiment is to provide an illumination system structure 50 combined by three light source devices. Please refer to FIG. 5. The illumination system structure 50 of the fourth embodiment is constituted by further installing a third light source device 51 and a third reflecting portion 52 in the structure of the illumination system 30 of the second embodiment mentioned above, in which the first and the second light source devices 31 and 32 are installed along the vertical direction and the third light source device 51 is installed in front of the opening 323 of the second light source device 32. The third light source device 51 comprises a burner 511, a parabola-shaped reflecting shade 512 and an opening 513. A light beam emitted from the burner 511 is reflected by the parabola-shaped reflecting shade 512 to generate a parallel light beam, and the burner 511 of the third light source 51 is installed perpendicular to the burner 311 of the first light source device 31 (i.e. along the horizontal direction). The opening 513 consists of a fourth light outlet 5131 and a fifth light outlet 5132. The fourth light outlet 5131 is installed far away from the second light outlet 3231 of the second light source device 32 to enable the light beam provided by the burner 511 to be directly output out of the third light source device 51, the second light source device 32 and the first light source device 31. Furthermore, the fifth light outlet 5132 is installed adjacent to the second light outlet 3231 so as to enable the light beam provided by the burner 511 to return back into the second light source device 32.

The third reflecting portion 52 is installed between the second light source device 32 and the third light source device 51 to guide the light beam from the second light outlet 3231 of the second light source 32 to be output from the fourth light outlet 5131 or to guide the light beam from the third light source device 51 to be incident into the second light source device 32. The third reflecting portion 52 in the fourth embodiment is a reflection mirror in which a surface thereof facing the second light outlet 315 and the fifth light outlet 5132 is a reflection mirror surface 521, one end of the third reflecting portion 52 is close to the rim of the reflecting shade 312 (far away from the rim of the first reflecting portion 313) and the other end thereof is close to the burner 511 of the third light source device 51 so as to cause the fifth light outlet 5132 to occupy approximately half area of the opening 513, and an inclined angle is formed in a direction opposite to a direction that the third reflecting portion 52 faces the burners 321 and 511, it is the best that the inclined angle is 45 degree so as to enable the light beam incident into the second light source device 32 and the light beam output out of the second light source device 32 to transmit back along the original routes by the reflection, and output directly from the fourth light outlet 5131 of the third light source device 51.

The light beam emitted from the burner 511 of the third light source device 51 is reflected by the reflecting shade 512 to generate a parallel light beam. A part of the light beam is output out of the third light source device 51, the second light source device 32 and the first light source device 31 from the fourth light outlet 5131, and the other part of the light beam is then projected on the third reflecting portion 52 to return back to the second light source device 32 and the first light source device 31. The returned light beam is finally integrated into the parallel light beam and output from the fourth light outlet 5131 after it is reflected many times between the first light source device 31 and the second light source device 32.

Utilizing the three light source devices can cause the brightness of the illumination system to be more enhanced, and the optical routes of the multiple light source devices (the first light source device 31, the second light source device 32 and the third light source device 51) are overlapped and integrated into a single parallel light beam, and then output out of the single light source device (i.e. the third light source device 51). Therefore, when one of the light source devices is damaged, the uniformity of the images on the screen can still be maintained in the illumination system so as to enable images to be displayed normally.

The Fifth Preferred Embodiment

Figure 6:
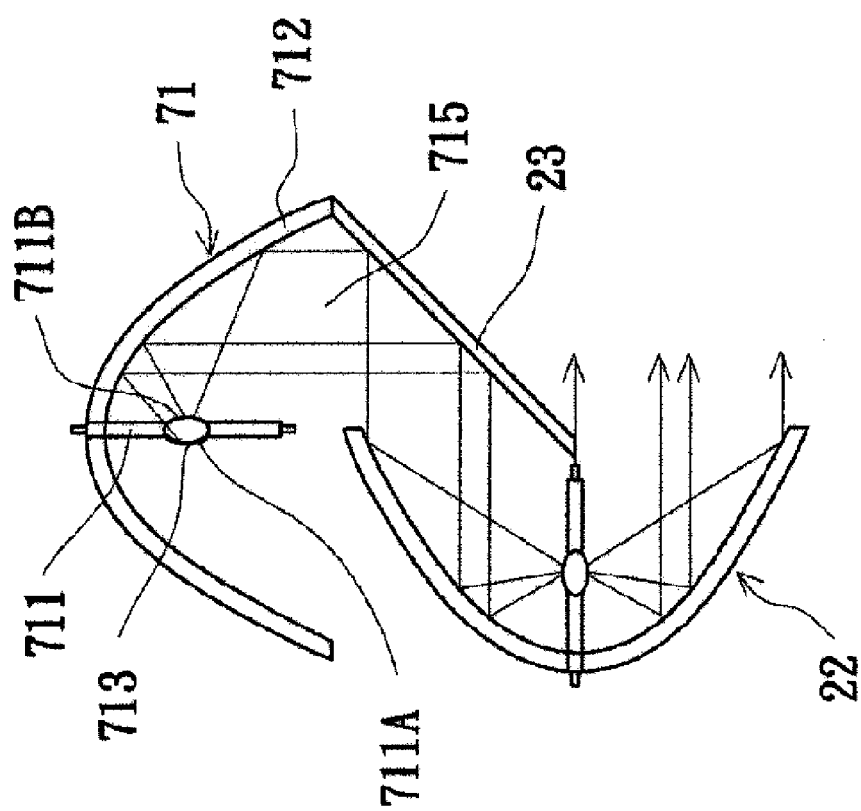
FIG. 6 is an optically schematic view, showing an illumination system of a fifth preferred embodiment according to the present invention.

Please refer to FIG. 6. The difference between the fifth preferred embodiment and the first preferred embodiment is installing a first reflecting portion 713 on a circumference surface 711A of a semicircle of a burner 711. The first reflecting portion 713 is installed on the circumference surface 711A of the left semicircle of the burner 711 and the first reflecting portion 713 is a structure in which an inner surface (i.e. a surface facing the burner 711) thereof is a reflecting surface so as to allow a light beam emitted from the burner 711 to be partly output directly from a circumference surface of another semicircle 711B (i.e. a place where the first reflecting portion 713 is not installed), and the light beam is reflected by a reflecting shade 712 to generate a parallel light beam and output from the first light outlet 715, the light beam emitted from the burner 711 is then partly projected on the first reflecting portion 713, and then reflected by the reflecting shade 712 to cause the light beam to be output from the first light outlet 715 after it is reflected by the first reflecting portion 713 to output out of the burner 711 so as to replace the structure of the first reflecting portion 213 in the first embodiment. However, the second light source device 22 and the second reflecting portion 23 in the fifth embodiment are adopted from the structures of the first embodiment. The fifth embodiment can similarly attain to the effect that is outputting the light beam from the first light outlet 715 with a half area of the opening of a first light source device 71.

The Sixth Preferred Embodiment

Figure 7:
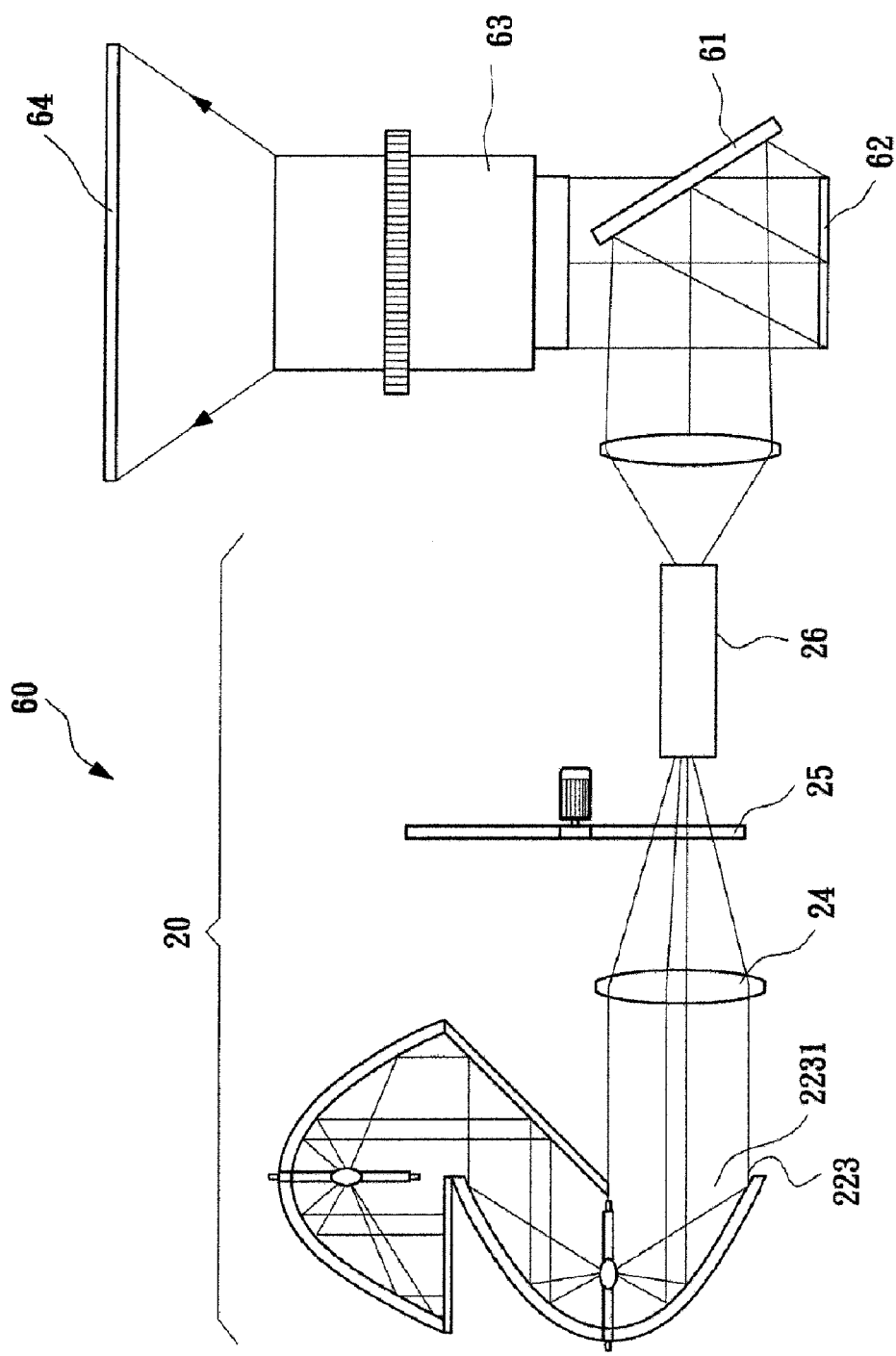
FIG. 7 is an optically schematic view, showing an illumination system of the present invention applied in a projection system.

Please refer to FIG. 7. The illumination system 20 of the present invention is utilized in a digital light processing (DLP) projection system 60. It comprises the illumination system 20, a reflection mirror 61, a reflecting light valve 62 and a projection lens 63, in which the light valve 62 is a digital micro-mirror device (DMD). The illumination system 20 further comprises a condenser 24, a color wheel 25 and an integrated rod 26 installed in front of the second light outlet 2231. Light beams of the two light source devices is integrated into a parallel light beam and output from the second light outlet 2231, and then condensed to be a condensed light beam through the condenser 24. Thereafter, the condensed light beam is projected on the light valve 62 through the reflection mirror 61 after light filtering and uniforming processes through the color wheel 25 and the integrated rod 26 to be formed an image light beam by means of the reflection process of the light valve 62. Finally, images are displayed on a screen 64 through the projection lens 63.

Because the integrated parallel light beam is output from the second light outlet 2231 with half area of the opening 223, the light distribution area is decreased. Consequently, the volume of the condenser 24 is decreased so as to lower the production cost.

Besides, the illumination systems in the second, the third, the fourth and the fifth embodiments of the present invention all can utilize further installing a condenser in front of the light outlet for the parallel light beam and apply the condenser on a digital light processing (DLP) projection system. Furthermore, the illumination systems of the first, the second, the third, the fourth and the fifth embodiment of the present invention also can be applied directly on a projection system in which a parallel light beam is adoptable.

Additional advantages and modifications will readily occur to those skilled in the art. Therefore, the invention in its broader aspects is not limited to the specific details and representative embodiments shown and described herein. Accordingly, various modifications are made without departing from the spirit or scope of the general inventive concept as defined by the appended claims and their equivalents.

What is claimed is:

1. An illumination system, comprising:
   a first light source device, comprising a first burner, a first parabola-shaped reflecting shade and a first reflecting portion, said first burner being installed in said first parabola-shaped reflecting shade and positioned on a focus of said first parabola-shaped reflecting shade, said first reflecting portion covering a part area of an opening of said first parabola-shaped reflecting shade, the other part area of said opening being formed a first light outlet;
   a second light source device, installed in front of said opening, and comprising a second burner, a second parabola-shaped reflecting shade and a second light outlet, said second burner being installed in said second parabola-shaped reflecting shade and positioned on a focus of said second parabola-shaped reflecting shade, said second light outlet being disposed at an opening of said second parabola-shaped reflecting shade; and
   a second reflecting portion, installed between said first light source device and said second light source device to guide a light beam from said first light source device to be output from said second light outlet.

2. The illumination system according to claim 1, further comprising a condenser installed in front of said second light outlet for transferring said light beam to be a condensed beam.

3. The illumination system according to claim 1, wherein an area of said first reflecting portion and said second light outlet is smaller than an area of said opening.

4. The illumination system according to claim 1, wherein said first reflecting portion occupies approximately half area of said opening of said first light source device.

5. The illumination system according to claim 1, wherein said second light outlet occupies approximately half area of said opening of said second light source device.

6. The illumination system according to claim 1, wherein said first reflecting portion is a reflection mirror, and is installed in a direction perpendicular to a direction of said first burner of said first light source device.

7. The illumination system according to claim 1, wherein at least one of said first reflecting portion and said second reflecting portion is a cold mirror or a prism with a total reflection surface.

8. The illumination system according to claim 1, wherein at least one of said first reflecting portion and said second reflecting portion is a dichroic mirror.

9. The illumination system according to claim 1, wherein said first burner of said first light source device and said second burner of said second light source device are disposed perpendicular to each other.

10. The illumination system according to claim 9, wherein said second reflecting portion is a reflection mirror, and said second reflecting portion is formed an inclined angle of approximate 45 degree facing a direction opposite to a direction of said second burner of said second light device.

11. The illumination system according to claim 1, wherein said first burner of said first light source device and said second burner of said second light source device are disposed parallel to each other.

12. The illumination system according to claim 11, wherein said second reflecting portion comprises a pair of reflection mirrors parallel to each other, and said reflection mirror is formed an inclined angle of approximate 45 degree facing a direction opposite to a direction of said first burner of said first light source device.

13. The illumination system according to claim 1, further comprising a third light source device and a third reflecting portion, said third light source device being installed in front of second light outlet, and said third light source device comprising a third burner, a third reflecting shade and a third light outlet, said third reflecting portion being installed between said second light source device and said third light source device to guide a light beam from said second light source device to be output from said third light outlet.

14. The illumination system according to claim 13, wherein the first burner and third burner of said first and said third light source devices are respectively disposed along a horizontal direction, the second burner of said second light source device is disposed along a vertical direction, and said second and said third reflecting portions are reflection mirrors, and said third reflecting portion is formed an inclined angle of approximate 45 degree facing a direction opposite to a direction of said third burner of the third light device.

15. The illumination system according to claim 13, wherein the first burner and the second burner of said first light source device and said second light source device are disposed along a vertical direction, the third burner of said third light source device is disposed along a horizontal direction, and a second reflecting portion comprises a pair of reflection mirrors parallel to each other, and said reflection mirror is formed an inclined angle of approximate 45 degree facing a direction opposite to a direction of said first burner of said first light device, said third reflecting portion is a reflection mirror, and said third reflecting portion is formed an inclined angle of approximate 45 degree facing a direction opposite to a direction of said third burner of said third light device.

16. The illumination system according to claim 13, wherein said third reflecting portion is a cold mirror or a dichroic mirror or a prism with a total reflection surface.

17. A projection system, comprising:
   an illumination system, comprising:
      a first light source device, comprising a first burner, a first parabola-shaped reflecting shade and a reflecting portion, said first burner being installed in said first parabola-shaped reflecting shade and positioned on a focus of said first parabola-shaped reflecting shade, said first reflecting portion covering a part of area of an opening of said first parabola-shaped reflecting shade, the other area of said opening is formed a first light outlet;
      a second light source device, installed in front of said opening, and comprising a second burner, a second parabola-shaped reflecting shade and a second light outlet, said second burner being installed in said second parabola-shaped reflecting shade and positioned on a focus of said second parabola-shaped reflecting shade, said second light outlet being positioned at an opening of said second parabola-shaped reflecting shade;
      a second reflecting portion, installed between said first light source device and said second light source device to guide a light beam from said first light source device to be output from said second light outlet; and a condenser installed in front of said second light outlet for transferring said light beam to a condensed beam;

a reflecting light valve, installed on an optical route of said condensed light beam for processing and reflecting said condensed beam; and a projection lens, installed on a route of the light beam reflected from said reflecting light valve.

18. The projection system according to claim 17, wherein said reflecting light valve is a digital micro-mirror device (DMD).

19. The projection system according to claim 17, wherein said illumination system further comprises a third light source device and a third reflecting portion, said third light source device is installed in front of second light outlet, and said third light source device comprises a third burner, a third reflecting shade and a third light outlet, said third reflecting portion is installed between said second light source device and said third light source device to guide a light beam from said second light source device to be output from said third light outlet.

20. The projection system according to claim 17, wherein said reflecting portion is a reflection mirror, a cold mirror, or a prism with a total reflection surface or a dichroic mirror.

* * * * *